US010813808B2

(12) United States Patent
Fiedler et al.

(10) Patent No.: US 10,813,808 B2
(45) Date of Patent: Oct. 27, 2020

(54) CHASSIS OF A TRANSPORTABLE DEVICE

(71) Applicant: HAWE Altenstadt Holding GmbH, Altenstadt (DE)

(72) Inventors: Klaus Fiedler, Neutraubling (DE); Thomas Stockmeier, Regensburg (DE)

(73) Assignee: HAWE Altenstadt Holding GmbH, Altenstadt (DE)

( * ) Notice: Subject to any disclaimer, the term of this patent is extended or adjusted under 35 U.S.C. 154(b) by 0 days.

(21) Appl. No.: 16/485,668

(22) PCT Filed: Feb. 6, 2018

(86) PCT No.: PCT/EP2018/052907
§ 371 (c)(1),
(2) Date: Aug. 13, 2019

(87) PCT Pub. No.: WO2018/149691
PCT Pub. Date: Aug. 23, 2018

(65) Prior Publication Data
US 2020/0000663 A1 Jan. 2, 2020

(30) Foreign Application Priority Data
Feb. 15, 2017 (DE) .......... 10 2017 103 050

(51) Int. Cl.
*A61G 7/05* (2006.01)
*A61G 13/10* (2006.01)
(Continued)

(52) U.S. Cl.
CPC .......... *A61G 7/0528* (2016.11); *A61G 13/104* (2013.01); *B60B 33/0089* (2013.01);
(Continued)

(58) Field of Classification Search
CPC .......... A61G 7/0528; A61G 13/104; B60B 33/0089; B60B 33/0092; B60B 2200/242; B60T 1/14; F16D 63/008
(Continued)

(56) References Cited

U.S. PATENT DOCUMENTS 2,262,288 A * 11/1941 Klipstein .............. D06F 39/125
188/152
2,837,387 A * 6/1958 Greville ................. A61G 13/10
248/404

(Continued)

FOREIGN PATENT DOCUMENTS

DE         19 84 236 U    4/1968
DE    10 2012 001 555 A1  8/2013

*Primary Examiner* — Muhammad Ijaz
(74) *Attorney, Agent, or Firm* — Aslan Law, P.C.

(57) ABSTRACT

A chassis of a transportable device including a base structure, four casters arranged thereon, four lowerable and raiseable support feet also mounted on the base structure, and a hydraulic support foot actuating device. The hydraulic support foot actuating device has a reservoir (1), a pump (2) manually operable by hand or foot, four support foot linear actuators (3) and a purely hydro-mechanical pipe and valve arrangement (4) which connects the reservoir (1), the pump (2) and the linear actuators (3) to one another. Therein, by means of hydraulic fluid delivered by the pump (2) from the reservoir (1) the two support feet assigned to two primary linear actuators (3*a*) can be fully extended until a mechanical stop is reached while raising the base structure by first applying pressure to the two primary linear actuators (3*a*) before applying pressure to the two other, secondary linear actuators (3*b*).

20 Claims, 2 Drawing Sheets

Figure 1:
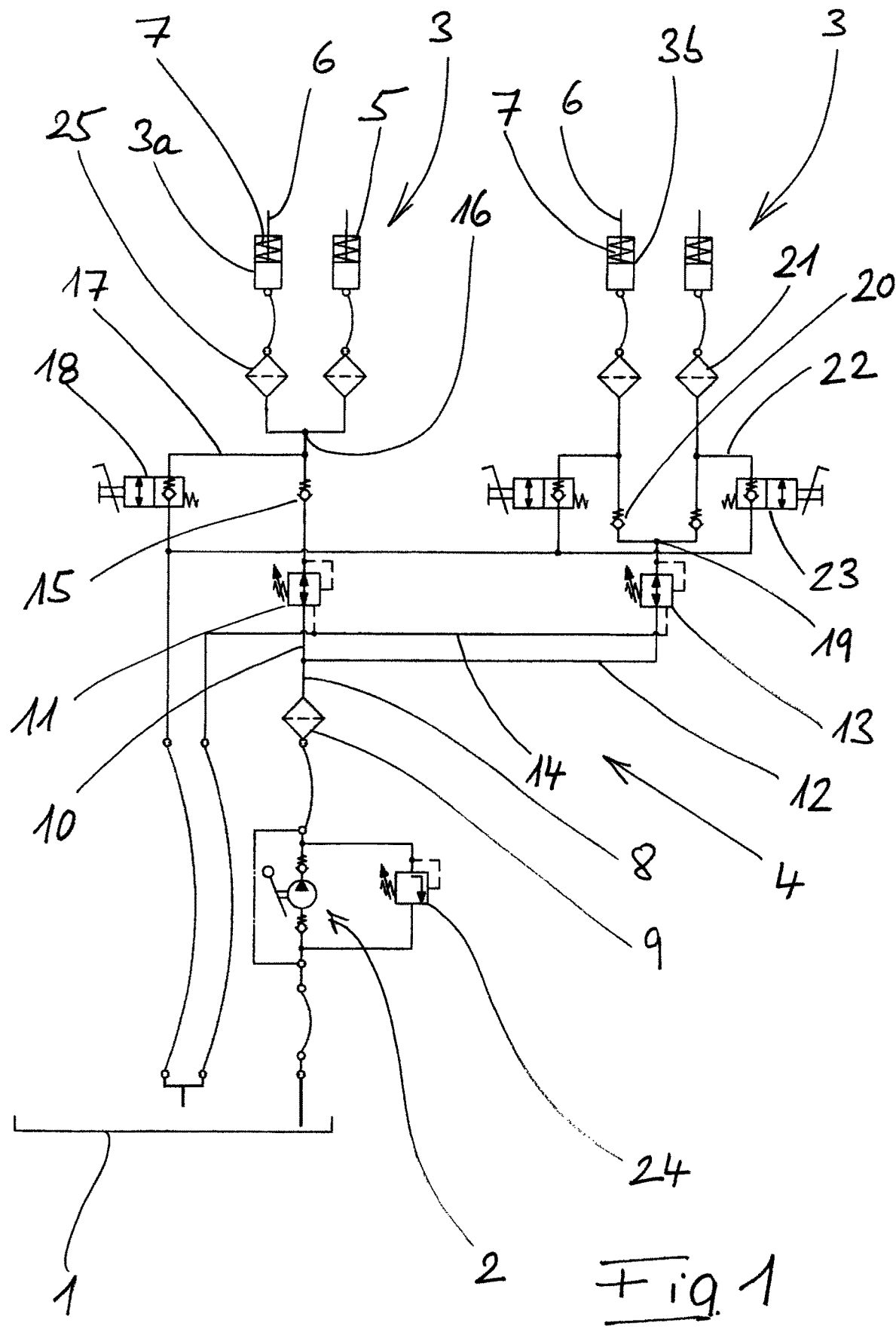

(51) Int. Cl.
    *B60B 33/00*     (2006.01)
    *B60T 1/14*     (2006.01)
    *F16D 63/00*     (2006.01)

(52) U.S. Cl.
    CPC ..... *B60B 33/0092* (2013.01); *B60B 2200/242* (2013.01); *B60T 1/14* (2013.01); *F16D 63/008* (2013.01)

(58) Field of Classification Search
    USPC .................. 248/129, 99; 188/5; 16/33, 35 R
    See application file for complete search history.

(56) References Cited

U.S. PATENT DOCUMENTS

| | | | | |
|---|---|---|---|---|
| 4,077,086 | A * | 3/1978 | Butler | B60B 33/0089 |
| | | | | 16/33 |
| 7,419,019 | B1 * | 9/2008 | White | A61G 7/08 |
| | | | | 180/19.1 |
| 8,087,126 | B2 * | 1/2012 | Duvert | B60B 33/0015 |
| | | | | 16/33 |
| 8,955,817 | B2 * | 2/2015 | Nakata | G02B 21/0012 |
| | | | | 248/680 |
| 2019/0366556 | A1 * | 12/2019 | Wang | B22D 37/00 |

* cited by examiner

CHASSIS OF A TRANSPORTABLE DEVICE

CROSS-REFERENCE TO RELATED APPLICATIONS

This application claims priority to DE Patent Application No. 10 2017 103 050.6 filed on Feb. 15, 2017, and to PCT Application No. PCT/EP2018/052907 filed on Feb. 6, 2018, the entire contents of which are hereby incorporated by reference.

The present invention relates to a chassis of a transportable device, comprising a base structure and four casters arranged on it.

Various devices which are intended to be set up or used at different locations have such a chassis. This applies in particular to heavy and/or bulky devices such as, for example, operating tables, hospital beds, surgical robots as well as examination and treatment equipment in the medical field and various machines and equipment in the industrial field.

Various possibilities are known to secure the respective transportable device at the place of installation, i.e. in particular to secure it against unintentional rolling away. Frequently, brakes acting on the casters and blocking them are used for this purpose. In the case of chassis with swivel casters, however, it is disadvantageous that even with blocked casters—by swivelling the caster carrier in the bearing arrangement about a vertical swivel axis offset from the point of contact of the caster on the ground—movement of the device in question is still possible to a certain extent. If this is not tolerable for the device in question, then in addition to blocking the caster in the caster carrier, the caster carrier itself must be blocked in the bearing arrangement, which means a considerable additional effort. If an absolutely secure, immovable securing of the position of the device at the respective place of installation or use is desired or required, then instead of braked casters, lowerable and raiseable support feet are used which are partially arranged on the base structure and which, in their completely lowered position, relieve the casters or lift them off the ground and slightly raise the base structure. A support foot actuating device is used to lower and raise the support feet.

The present invention has set itself the task of providing a chassis of the type mentioned at the beginning, which, using comparatively simple and reliable means, makes a reliable securing of the position of the associated device at the respective installation location possible, wherein the securing of the position is also—in the case of an uneven ground at the installation location—to prevent the device from tilting and—in order to change the installation or operation location—is to be quick and easy to lift.

The task is solved according to the invention by the chassis specified in the claim. It is therefore characterized by the following characteristics, which interact synergetically with each other and with the characteristics indicated at the beginning: The chassis comprises four lowerable and raiseable support feet arranged on the base structure and a hydraulic support foot actuating device. The hydraulic support foot actuating device comprises a reservoir, a pump manually operable by hand or foot, four support foot linear actuators and a pipe and valve arrangement connecting the reservoir, the pump and the linear actuators. The pipe and valve arrangement is configured purely hydro-mechanically in such a way that by means of hydraulic fluid delivered out of the reservoir by the pump, the two support feet assigned to two primary linear actuators can be fully extended until a mechanical stop is reached while raising the base structure by first applying pressure to the two primary linear actuators before applying pressure to the two other, secondary linear actuators.

A first significant characteristic is therefore that the support foot actuating device operates on a hydraulic principle. In this way, even the heaviest devices can be installed with a secure position using the present invention. Since the pump of the hydraulic support foot actuating device can be operated manually by hand or foot and the pipe and valve arrangement connecting the reservoir, the pump and the linear actuators is purely hydro-mechanical, i.e. in particular has no electrically or pneumatically actuated valves, there are no structural requirements (e.g. power supply or compressed air connection) for the respective installation location. In particular, the present invention can be used advantageously at locations with no or no reliable technical infrastructure for the device equipped with the chassis in question.

Tilting of the device on an uneven surface at the respective installation location is prevented by the specific hierarchical loading of the hydraulic linear actuators assigned to the four support feet, which is realized according to the invention. The pipe and valve arrangement used according to the invention has the effect that—with continued operation of the pump—two support feet are lowered until a mechanical stop is reached by applying the hydraulic fluid delivered by the pump to the linear actuators assigned to them, the so-called primary linear actuators—under appropriate pressure build-up—before pressure can be built up in the other two linear actuators, the so-called secondary linear actuators. The said mechanical stops provided on the respective primary linear actuator or on the associated support foot are configured in such a way that two associated casters more or less adjacent to the respective primary support feet—while lifting the base structure of the chassis—are lifted from the ground. The two support feet that can be moved by the secondary linear actuators are only adjusted to the extent that is possible without pressure build-up in the secondary linear actuators until the end positions of the primary support feet defined by the stops are reached, because otherwise the secondary support foot concerned "hangs in the air". Only when the end positions of the two primary support feet have been reached is it possible to build up pressure in the secondary linear actuators in such a way as to stabilize the device against tilting even under changing load situations. As explained in detail below, this pressure build-up is preferably limited by a pressure reducing valve, which is adjusted to the weight of the device, so that further lifting of the base structure does not happen.

For the sake of clarification and as a precaution only, it should be noted that, in the above sense, an adjustment of the linear actuators "without pressure build-up" is also to be understood as an adjustment at which the minimum hydraulic pressure required for an empty movement of the support feet, i.e. the movement of the free, unloaded support feet (against friction as well as a return spring, if provided) prevails in the linear actuators. Accordingly, "without pressure build-up" does in particular not mean that the linear actuator in question is depressurized or has the same pressure as in the storage tank.

According to a first preferred configuration of the present invention, the linear actuators are configured single-acting. This results in a particularly simple overall hydraulic system. This also takes into account the fact that the lowering of the base structure, which has been lifted in the positionally secured configuration of the device equipped with the chassis, until the chassis is carried solely by the casters, can usually be carried out under the weight of the device itself. Return springs may be provided for further raising of the support feet so that they return to their fully raised position. In particular, these can, in another preferred configuration, be integrated into the linear actuators. However, an arrangement of such return springs outside the linear actuators can also be considered.

Another preferred configuration of the present invention is characterized by the fact that the two primary linear actuators are hydraulically coupled in such a way that they are acted upon from the pump via a single, common primary non-return valve. The (common) non-return valve ensures a permanently reliable position of the device at the place of installation on the two maximum, i.e. up to the stop, extended first support feet. Preferably, a common primary drain line leading to the reservoir tank branches off between the primary non-return valve and the two primary linear actuators, in which a primary drain valve manually operable by hand or foot is arranged. By actuating that primary drain valve, the securing of the position of the device provided by the primary support feet is lifted, typically by lowering the base structure of the chassis to casters adjacent to the first support feet.

In contrast to the primary linear actuators, the two secondary linear actuators are hydraulically connected in parallel in such a way that they are acted upon by the pump via two separate secondary non-return valves, in accordance with another preferred configuration of the invention. In this way, with the device securely positioned at the installation location, the two secondary support feet are held independently and permanently in their respective positions preventing the tipping of the device. Preferably, an individual secondary drain line leading to the storage tank branches off between the respective secondary non-return valve and the respectively assigned secondary linear actuator, in each of which a secondary drain valve manually operable by hand or foot is arranged. By operating these two secondary drain valves, the securing of the position of the device provided by the secondary support feet is lifted, typically by lifting the support feet by means of the return springs mentioned above.

In a further preferred constructive configuration of the implementation of the present invention described above, a primary pressure reducing valve is inserted between the pump and the primary non-return valve and a common secondary pressure reducing valve is inserted between the pump and the two secondary non-return valves. The primary pressure reducing valve is set to a higher outlet pressure than the secondary pressure reducing valve. Thus, the hierarchical loading of the primary and secondary linear actuators from the pump described above can be achieved with little equipment effort and in a particularly reliable manner. After the four support feet—without pressure build-up (see above) in the respective linear actuator—have been lowered by actuating the pump, the secondary pressure reducing valve closes and only the two primary linear actuators are acted upon. If—due to the existing ground conditions—the lowering of the primary support feet to the respective stop towards the end of the lowering movement in question causes one of the two secondary support feet to be relieved, the secondary pressure reducing valve opens and the secondary support foot in question, which is "hanging in the air", is permanently adjusted accordingly. Thus, until the second primary support foot also reaches its end position defined by the assigned stop, a simultaneous lowering of a primary and a secondary support foot takes place. The final position of the device has thus been reached. To secure this position, a holding pressure can be generated in the secondary linear actuators by further actuating the pump, the level of which is determined by the secondary pressure reducing valve. As already explained above, the respective outlet pressure of the secondary pressure reducing valve is preferably adjusted to the weight of the device in such a way that it is not raised any further. And when the pump is operated further, the hydraulic fluid is preferably circulated via a pressure relief valve bridging the pump.

If the other components are skillfully matched, the primary pressure reducing valve can be dispensed with in the configuration of the invention described above. This allows a further simplification of the hydraulic system in terms of equipment. However, in this case there may be a loss of operation comfort as a pressure relief valve limiting the system pressure downstream of the pump typically has to be set to a lower maximum pressure. This eliminates the significant pressure jump that occurs when using a primary pressure reducing valve and a pressure relief valve set to a high maximum system pressure when reaching the stable final installation position of the device, so that the operator may notice less easily that the securing of the position process is complete.

In typical applications of this invention, the two primary support feet will be located on one side of the base structure and the two secondary support feet on the other opposite side. This has advantages especially when lifting the securing of the position by sequential operation of the drain valves. However, this is not mandatory. Rather, it is also conceivable in the context of the present invention to arrange the two primary and the two secondary support feet diagonally opposite each other in individual cases. In order to prevent a misunderstanding in this respect, the present invention is also suitable for use on chassis in which the four casters and/or the four support feet are not arranged at the corners of a rectangle, but distributed elsewhere. The statement that four casters and four support feet are provided should not be misinterpreted as meaning that only four casters and four support feet are provided. For example, more than two primary and two secondary support feet can be used. Finally, the above explanations must not be misunderstood to the effect that the support foot and the linear actuator actuating it must each be two structurally separate units; rather, the support foot and the linear actuator actuating it can also be combined to form an assembly, as is explained below by way of an exemplary embodiment. Thus, the invention also covers those designs in which the respective support foot is arranged indirectly, in particular via the assigned linear actuator, on the base structure.

Figure 2:
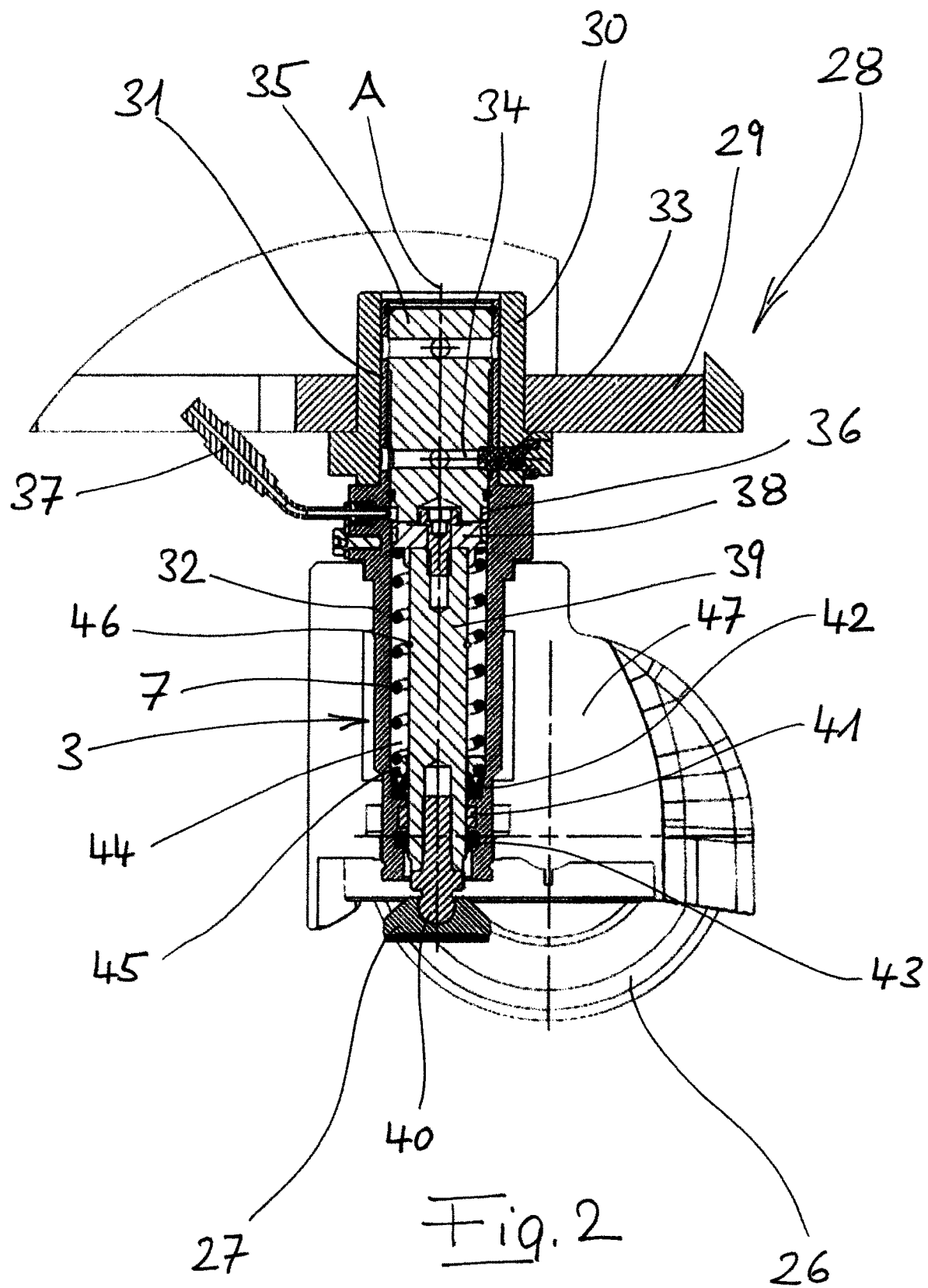

In the following, this invention is explained in more detail using a preferred embodiment illustrated in the drawing, wherein:

FIG. 1 shows a hydraulic circuit diagram of a hydraulic support foot actuating device which can be used within the scope of the invention and FIG. 2 shows a vertical section through a combined arrangement of caster, support foot and linear actuator in a common assembly which can be used within the scope of the invention.

A chassis on which the hydraulic support foot actuating device illustrated in FIG. 1 on the basis of its circuit diagram can be used, has a base structure (e.g. configured as a frame), four casters arranged thereon and four lowerable and raiseable support feet also arranged on the base structure. Such chassis are common and generally known. There is no need to explain chassis details that are not important for this invention.

The hydraulic support foot actuating device shown in FIG. 1 comprises a reservoir 1, a pump 2 manually operable by hand or foot, four support foot linear actuators 3 and a pipe and valve arrangement 4 connecting the reservoir 1, the pump 2 and the linear actuators 3. The four linear actuators 3 are configured as single-acting hydraulic cylinders 5. An integrated return spring 7 serves to reset the respective unit 6 consisting of piston and piston rod.

The pressure line 8 branches into two branches after a filter (strainer) 9. A first branch 10 leads to a primary pressure reducing valve 11; and a second branch 12 leads to a secondary pressure reducing valve 13. The primary pressure reducing valve 11 is set to a higher outlet pressure than the secondary pressure reducing valve 13. For correct maintenance of the preset outlet pressure—as a pressure difference from the pressure in reservoir 1—both pressure reducing valves 11 and 13 communicate with the reservoir via the additional hydraulic line 14.

On the output side, the primary pressure reducing valve 11 is connected to two primary linear actuators 3a via a primary non-return valve 15, a downstream branch 16 and two filters 25 (strainers). Between the primary non-return valve 15 and the two primary linear actuators 3a, a common primary drain line 17 branches off with a primary drain valve 18 manually operable by hand or foot arranged therein.

The secondary pressure reducing valve 13 is connected on the outlet side to two secondary linear actuators 3b via a branch 19, two secondary non-return valves 20 downstream of the branch 19 and two filters 21. An individual secondary drain line 22 with a secondary drain valve 23 operated manually by hand or foot arranged therein branches off between the secondary non-return valve 20 and the associated secondary linear actuator 3b. The primary drain line 17 and the two secondary drain lines 22 together lead back to the storage tank 1.

Finally, a pressure relief valve 24 bridging pump 2 is shown. This is used to circulate hydraulic fluid when pump 2 continues to be actuated after the two primary support feet associated with the primary linear actuators 3a have been completely lowered to the respective stop and the two secondary support feet associated with the secondary linear actuators 3b are firmly supported on the ground in accordance with the outlet pressure specified for the secondary pressure reducing valve 13.

FIG. 2 illustrates a way in which a caster 26, a support foot 27 and a linear actuator 3 can be combined to form a common assembly in a chassis according to the invention. Therein, a bearing sleeve 30 is attached to a frame 29 of the chassis forming the base structure 28. The cylinder 32 of the linear actuator 3 is inserted therein with an upwardly projecting cylindrical base 31. The securing of the position of the cylinder 32 in the bearing sleeve 30 is achieved by means of a screw 33 which is screwed into one of the tapped holes 34 of a core 35 inserted in the base 31, which closes the cylinder 32 tightly at the top and limits its hydraulic working space 36 at the top.

The hydraulic working space 36, which is acted upon by the hydraulic connection 37, is limited downwards by the piston 38. To the piston 38 the piston rod 39 is connected, at the lower end of which the support foot 27 is arranged. To compensate for a one-sided lifting of the base structure 28 (via the primary support feet) with the consequence of a slight inclination of the chassis, the support foot 27 is mounted on a ball head 40 attached to the end of the piston rod 39. In view of the transverse forces resulting from said inclination, the piston rod 39 in cylinder 32 is guided in separate sliding bushings 41. This also relieves the load on the two seals 42 and 43, which seal the annular space 44 between piston rod 39 and cylinder 32, which accommodates the return spring 7, downwards against the escape of hydraulic oil and the penetration of dirt.

In the area of the lower end of the return spring 7, a stop ring 45 is inserted in the annular space 44. The stop ring 46 fixed on the piston rod 39 acts together with this in the sense of a stop limiting the movement of the piston rod 39.

The caster carrier 47 is mounted on cylinder 32 of the linear actuator 3 and can be swivelled about the vertical axis A. In the caster carrier 47 in turn, two casters 26 are rotatably mounted, which—as double casters—are arranged offset to each other in such a way that the linear actuator 3 finds space between them.

The invention claimed is:

1. A Chassis of a transportable device comprising:
a base structure:
four casters arranged on said base structure;
four lowerable and raiseable support feet arranged on the base structure; and
a hydraulic support foot actuating device, wherein the hydraulic support foot actuating device which comprises a reservoir, a pump manually operable by hand or foot, four support foot linear actuators and a pipe and valve arrangement connecting the reservoir, the pump and the linear actuators, configured in such a way that, by means of hydraulic fluid delivered by the pump from the reservoir, two support feet of said four lowerable and raiseable support feet assigned to as two primary linear actuators can be fully extended until a mechanical stop is reached while raising the base structure by first applying pressure to the two primary linear actuators before applying pressure to two other of said four lowerable and raiseable support feet being secondary linear actuators.

2. The Chassis according to claim 1, wherein the linear actuators are configured single-acting.

3. The Chassis according to claim 2, wherein the two primary linear actuators are hydraulically coupled in such a way that the two primary linear actuators are acted upon from the pump via a single, common primary non-return valve.

4. The Chassis according to claim 3, wherein a common primary drain line branches off between the primary non-return valve and the two primary linear actuators.

5. The Chassis according to claim 4, wherein a primary drain valve manually operably by hand or foot is arranged in the primary drain line.

6. The Chassis according to claim 5, wherein a primary pressure reducing valve is inserted between the pump and the primary non-return valve.

7. The Chassis according to claim 6, wherein the two secondary linear actuators are hydraulically connected in parallel in such a way that the two secondary linear actuators are acted upon by the pump via two separate secondary non-return valves.

8. The Chassis according to claim 7, wherein an individual secondary discharge line branches off in each case between the respective secondary non-return valve and the respectively associated secondary linear actuator.

9. The Chassis according to claim 8, wherein a secondary drain valve manually operable by hand or foot is arranged in each case in the secondary drain lines.

10. The Chassis according to claim 9, wherein
a common secondary pressure reducing valve is inserted between the pump and the secondary non-return valves.

11. The Chassis according to claim 10, wherein
the primary pressure reducing valve is set to a higher outlet pressure than the secondary pressure reducing valve.

12. The Chassis according to claim 1, wherein
the two primary linear actuators are hydraulically coupled in such a way that the two primary linear actuators are acted upon from the pump via a single, common primary non-return valve.

13. The Chassis according to claim 3, wherein
a primary pressure reducing valve is inserted between the pump and the primary non-return valve.

14. The Chassis according to claim 4, wherein
a primary pressure reducing valve is inserted between the pump and the primary non-return valve.

15. The Chassis according to claim 1, wherein
the two secondary linear actuators are hydraulically connected in parallel in such a way that the two secondary linear actuators are acted upon by the pump via two separate secondary non-return valves.

16. The Chassis according to claim 2, wherein
the two secondary linear actuators are hydraulically connected in parallel in such a way that the two secondary linear actuators are acted upon by the pump via two separate secondary non-return valves.

17. The Chassis according to claim 3, wherein
the two secondary linear actuators are hydraulically connected in parallel in such a way that the two secondary linear actuators are acted upon by the pump via two separate secondary non-return valves.

18. The Chassis according to claim 4, wherein
the two secondary linear actuators are hydraulically connected in parallel in such a way that the two secondary linear actuators are acted upon by the pump via two separate secondary non-return valves.

19. The Chassis according to claim 5, wherein
the two secondary linear actuators are hydraulically connected in parallel in such a way that the two secondary linear actuators are acted upon by the pump via two separate secondary non-return valves.

20. The Chassis according to claim 7, wherein
a common secondary pressure reducing valve is inserted between the pump and the secondary non-return valves.

* * * * *